J. RAVEN.
RATCHET SPANNER.
APPLICATION FILED APR. 12, 1920.
1,388,760.
Patented Aug. 23, 1921.
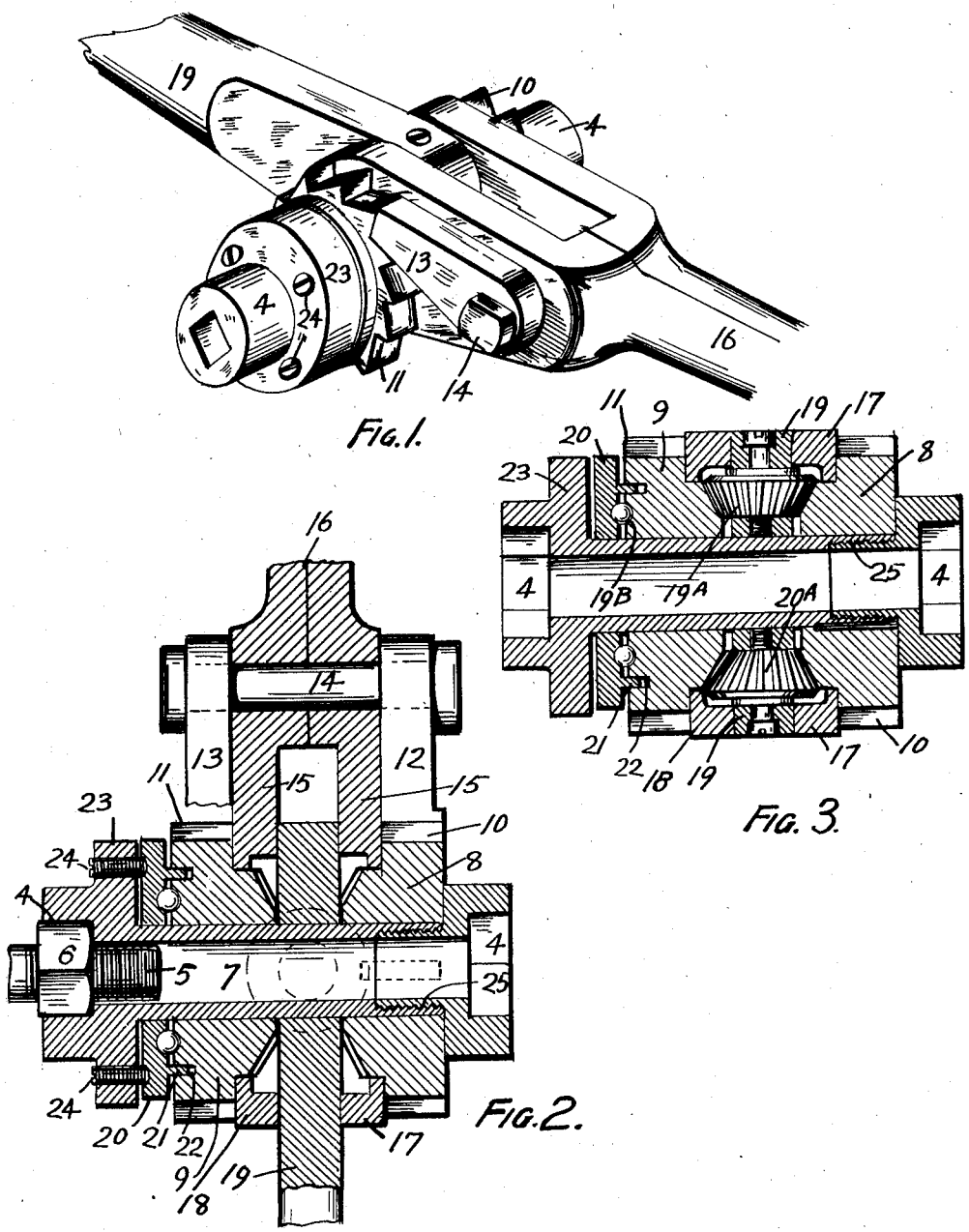
Inventor
John Raven

UNITED STATES PATENT OFFICE.

JOHN RAVEN, OF DEERVALE, VIA ARMIDALE, NEW SOUTH WALES, AUSTRALIA.

RATCHET-SPANNER.

1,388,760.  Specification of Letters Patent.  Patented Aug. 23, 1921.

Application filed April 12, 1920. Serial No. 373,251.

*To all whom it may concern:*

Be it known that I, JOHN RAVEN, a subject of the King of Great Britain, residing at Deervale, via Armidale, in the State of New South Wales, Commonwealth of Australia, have invented certain new and useful Improvements in Ratchet-Spanners, of which the following is a specification.

This invention has reference to improvements in ratchet spanners intermittently or continuously rotated on reciprocation of a hand lever and is especially applicable for rapidly tightening up nuts of large size without interference with the passage or get away of the bolt and for unscrewing nuts by reversal of the tool.

In the drawings herewith,

Figure 1 represents a perspective view of the invention, while,

Fig. 2 is a central section.

Fig. 3 is a plan of the holding or stationary arm and intermediate bevel pinions.

4 represents a socket adapted to take over the end of a bolt 5 and a nut 6 thereon. Said socket is an extension of a hollow spindle 7 to which one or other of the bevel wheels 8 and 9 is keyed. Said wheels have integral therewith respective opposite ratchets 10 and 11 driven alternately by the spring pawls 12 and 13 carried by the bolt 14 which passes through the arms 15 on the reciprocable operating handle 16. Extensions 17 and 18 of said handle take around the spindle 7. A holding handle 19 is held stationary and contains the intermediate bevel pinions 19$^A$ and 20$^A$ through which the continuous movement is obtained. The movement may be intermittent instead of continuous by throwing one pawl 12 or 13 out of gear with its respective ratchet.

The opposite end of the hollow spindle 7 has a similar socket 4 so that it may be utilized to unscrew a nut on reversing the tool.

Ball bearings 19$^B$ are provided between the outer face of the wheel 9 and a cover plate 20 which has a circumferential lip 21 taking in a corresponding groove 22 to prevent access of dust. An annular extension 23 of the spindle forms a cover through which pass adjusting screws 24 to take up any wear. The opposite socket 4 has an externally threaded extension 25 which takes in a recessed thread formed in the inner periphery of the hollow spindle. This socket 4 may be secured to the spindle in any convenient manner.

Having now described my invention, what I claim as new and desire to protect by Letters Patent is:—

1. In ratchet spanners, the combination of a hollow spindle, two bevel wheels mounted on said spindle in spaced relation, one of said bevel wheels being secured to the spindle, opposite ratchets on said bevel wheels, a reciprocatory operating lever, pawls carried by said lever and adapted to alternately rotate said wheels in accordance with the movements of the lever, a holding arm interposed between said wheels, bevel pinions carried by said holding arm and meshing with said bevel wheels, said spindle having a socket at each end for engaging the nut of a bolt whereby said nut may be continuously rotated in one direction by the reciprocation of said lever, and the threaded end of the bolt may pass through said hollow spindle.

2. In ratchet spanners, the combination with oppositely rotatable bevel wheels having ratchets fixed thereto, a holding arm, intermediate bevel pinions carried by said arm and meshing with said bevel wheels, a reciprocatory operating lever, and pawls carried by said lever for engaging said ratchets respectively, of a hollow spindle on which one of said bevel wheels is secured and the other is loosely mounted, said spindle having an extension forming a socket for the nut of a bolt and permitting passage of the end of the bolt therethrough substantially as described.

In testimony whereof I have hereunto set my hand.

JOHN RAVEN.